UNITED STATES PATENT OFFICE.

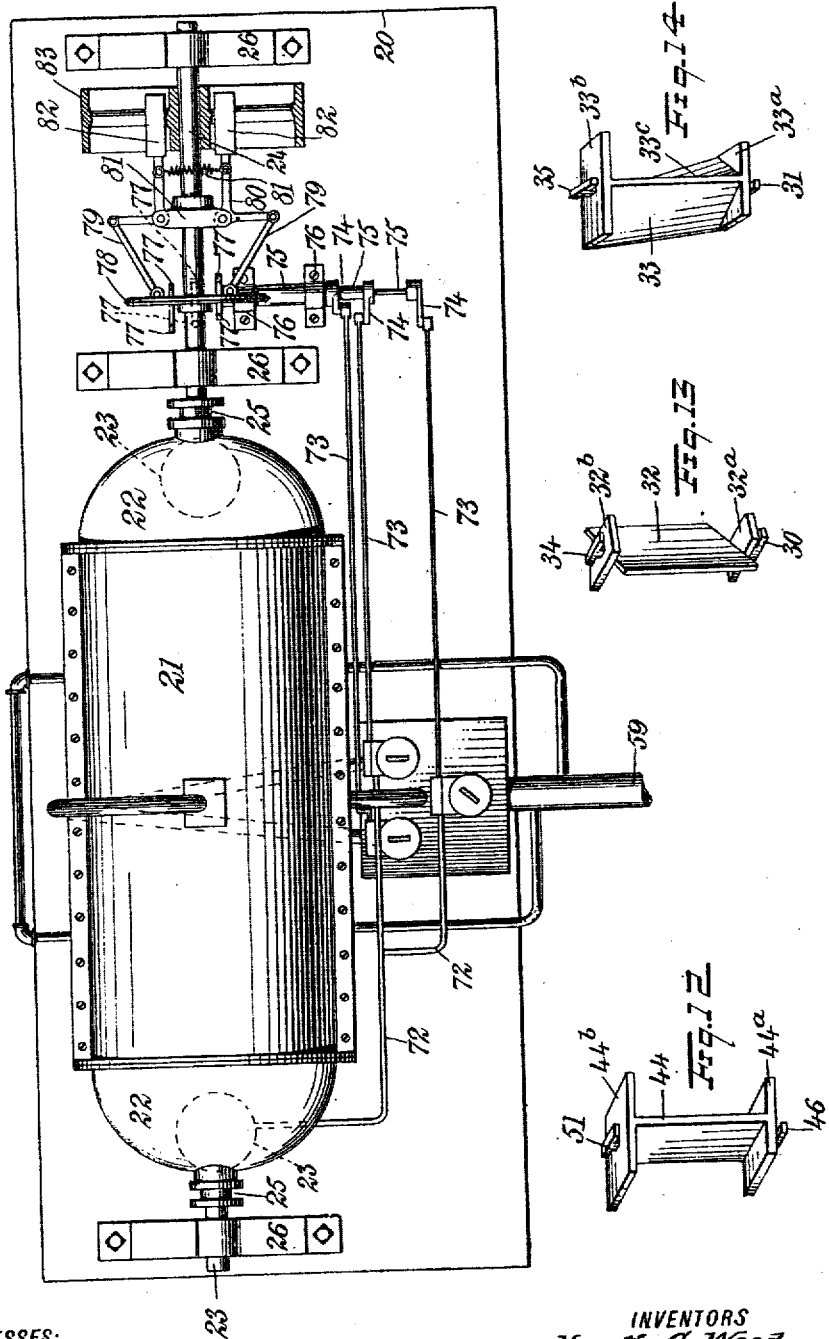

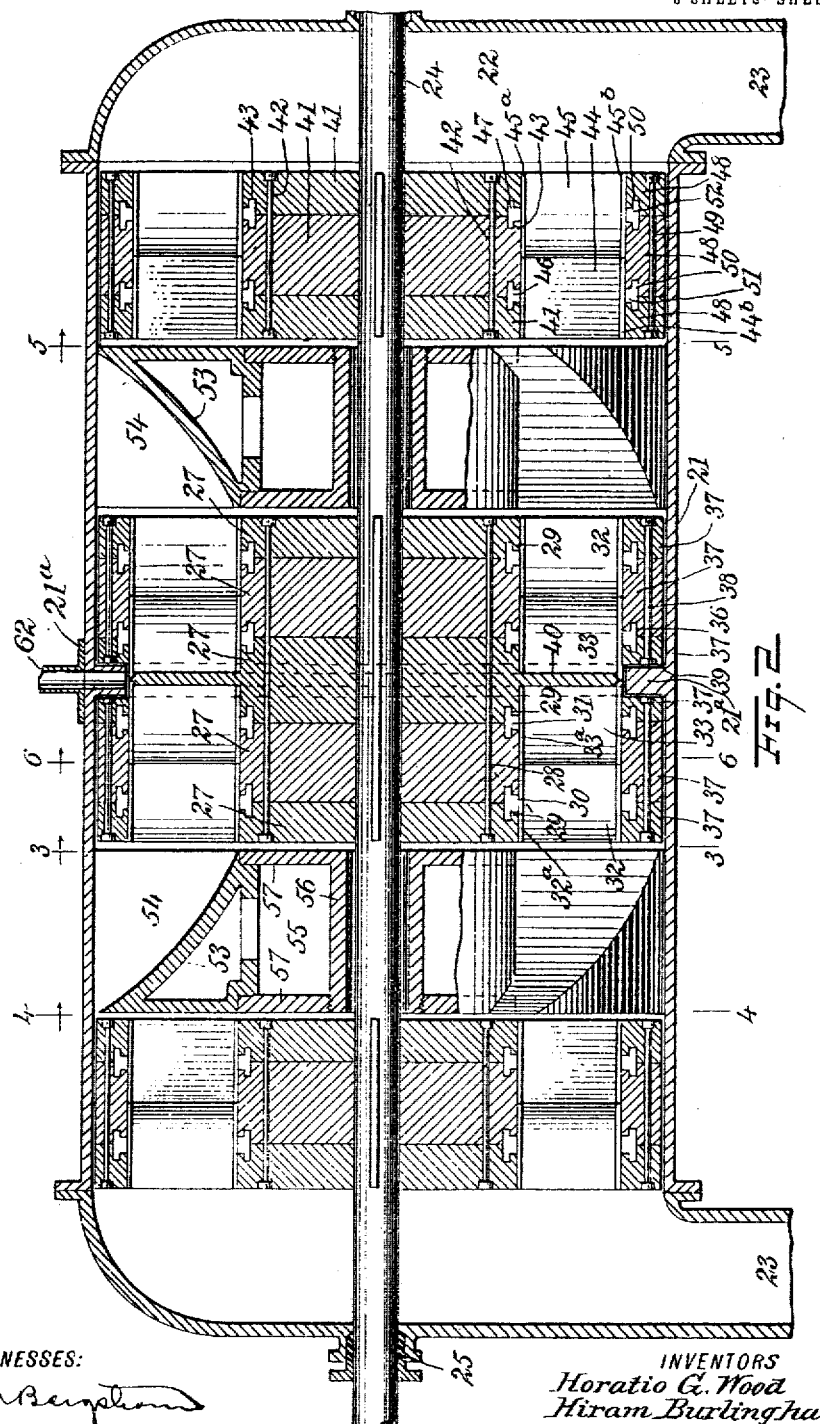

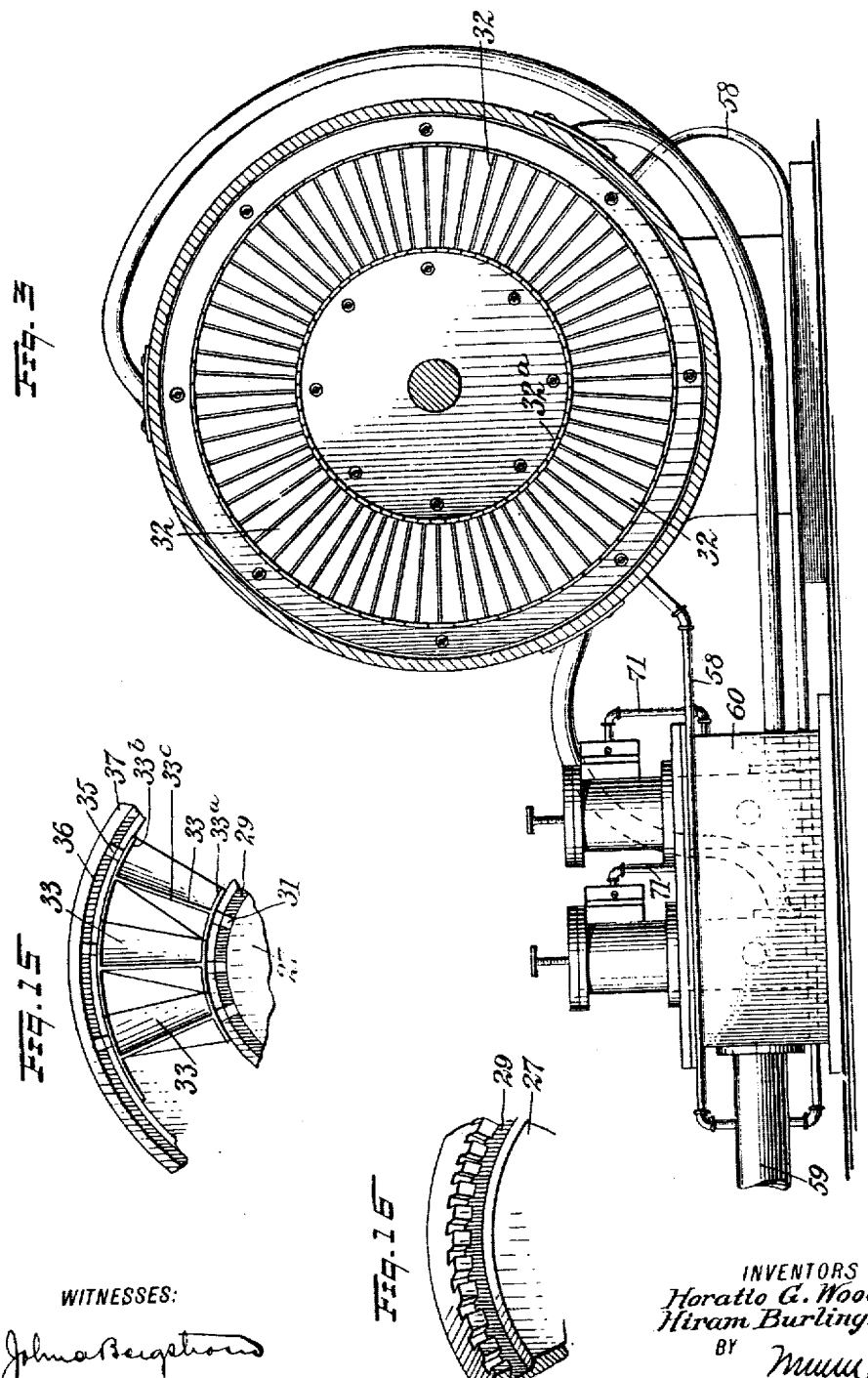

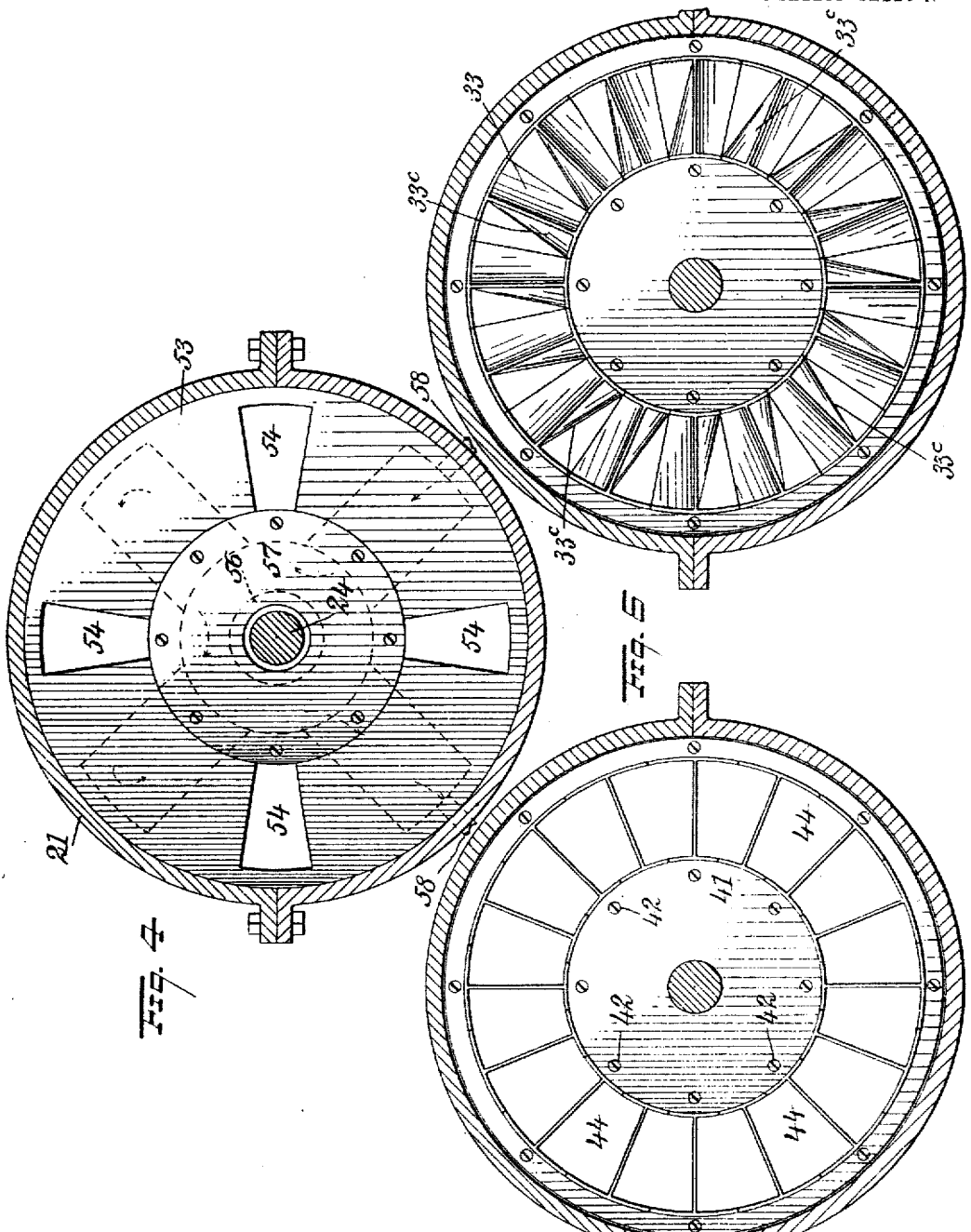

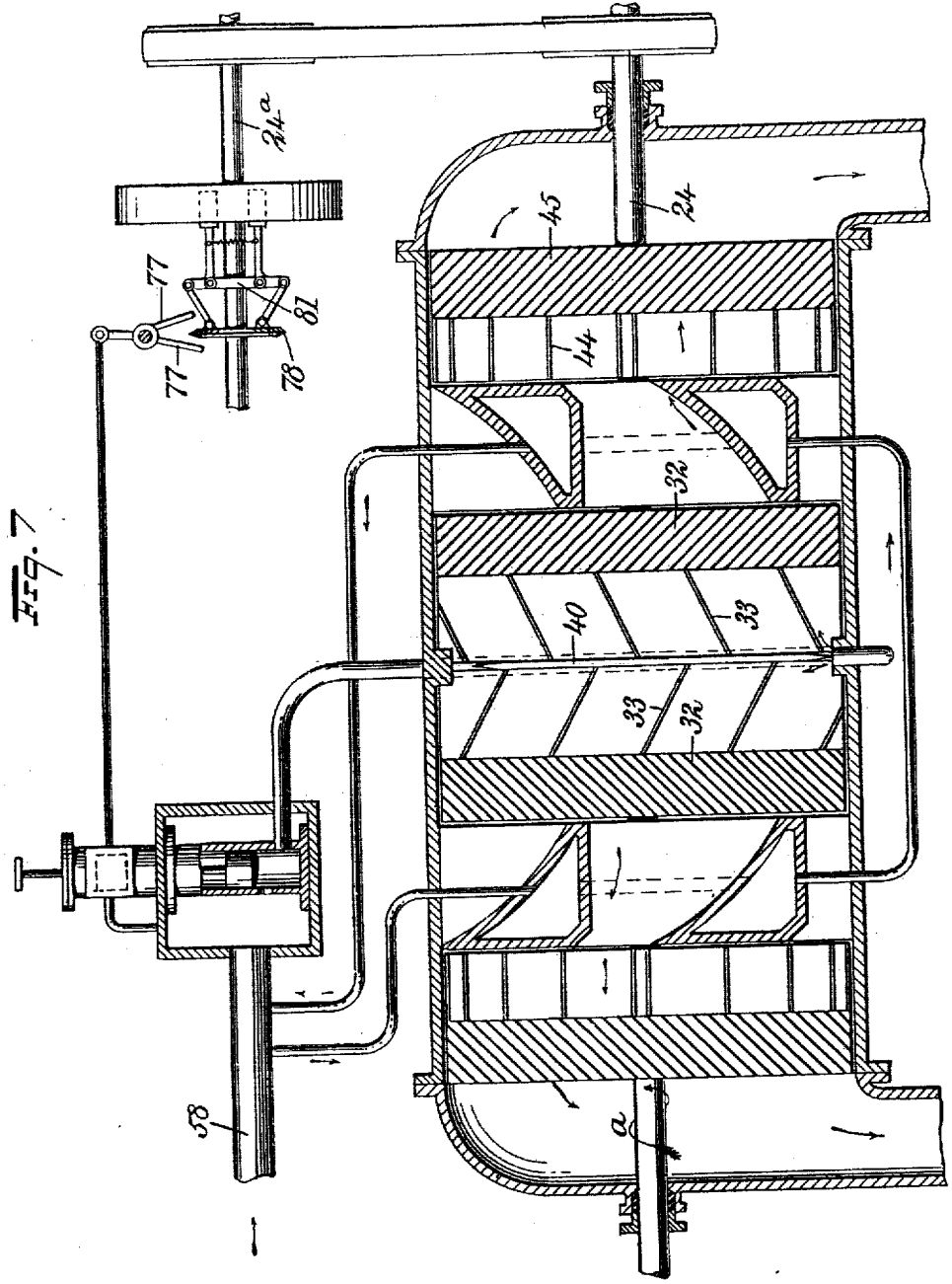

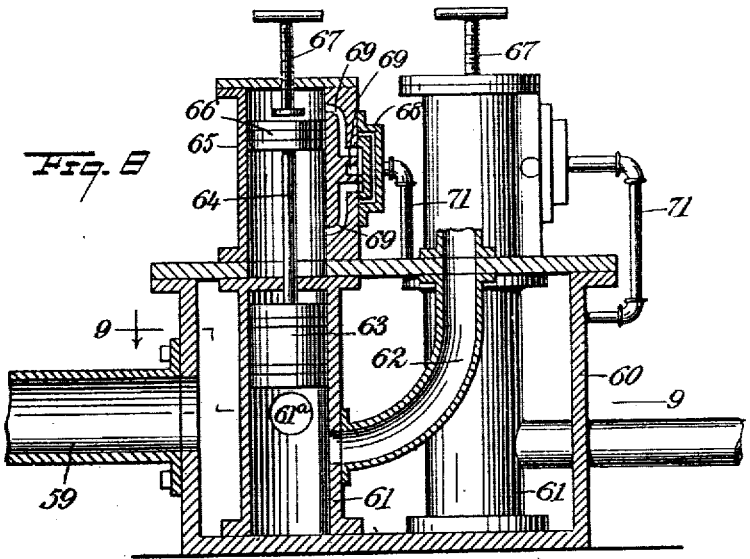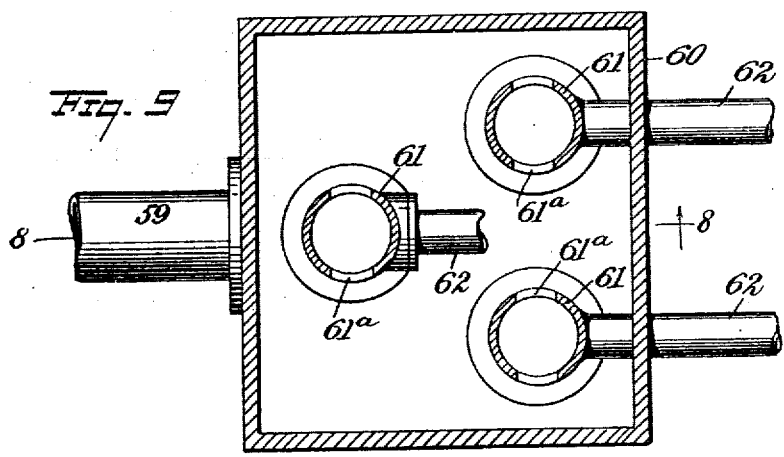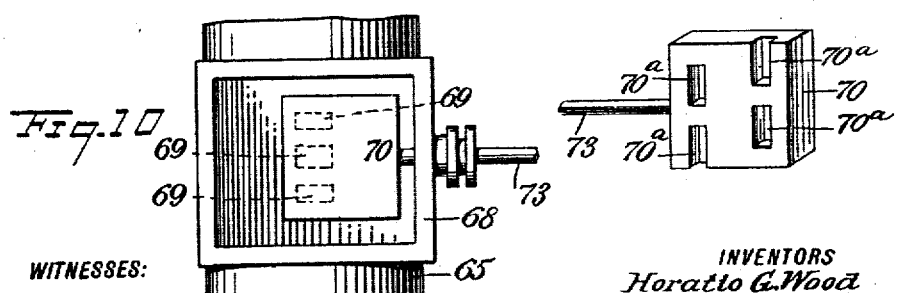

HORATIO G. WOOD AND HIRAM BURLINGHAM, OF NEWPORT, RHODE ISLAND.

ELASTIC-FLUID TURBINE.

No. 808,134.     Specification of Letters Patent.     Patented Dec. 26, 1905.

Application filed September 1, 1904. Serial No. 222,981.

*To all whom it may concern:*

Be it known that we, HORATIO G. WOOD and HIRAM BURLINGHAM, citizens of the United States, and residents of Newport, in the county of Newport and State of Rhode Island, have invented a new and Improved Elastic-Fluid Turbine, of which the following is a full, clear, and exact description.

The object of this invention is to provide an elastic-fluid turbine useful particularly in connection with steam and in which the kinetic energy of the motive fluid will be maintained as high as possible throughout its movement through the turbine.

The further object of the invention is to so distribute the motive fluid in the turbine as to secure the full benefit of the motive force and to equalize as fully as possible the strains on the apparatus.

A further object is to improve the regulation of the speed of the rotating parts by providing devices for throttling the motive-fluid supply, and the invention comtemplates various other objects of major or minor importance, all of which will fully appear hereinafter.

In attaining the various ends in view we provide a turbine the rotor of which comprises its main central part, having peculiarly-arranged vanes or buckets and end or wing parts also having peculiarly-arranged buckets or vanes spaced from the main or central part of the rotor. Located within the spaces between said parts of the rotor are two means for increasing the pressure of the motive fluid as it passes from the central part of the rotor to the two end or wing parts thereof. In case steam is the motive fluid employed, and this is the special purpose of our invention, this auxiliary means for increasing the pressure of the fluid consists in superheaters supplied with steam from the main steam source or from any other source desired. The motive fluid is introduced into the shell at several equidistant points around the circumference thereof opposite the center of the main part of the rotor by means of nozzles properly disposed, and each nozzle is supplied with a valve controlling the fluid movement therein. These valves are operated automatically by a peculiar governor which causes the valves to close and open in succession and the speed of the turbine to be gradually increased or reduced, according to the governor action.

Our invention resides in certain features of construction and relative arrangement of parts, which will be fully set forth hereinafter and pointed out in the claims.

Reference is had to the accompanying drawings, showing as an example the preferred embodiment of our invention adapted for use with steam as a motive fluid, in which drawings like numerals of reference indicate like parts in the several views, and in which—

Figure 1 is a general plan view of the entire apparatus. Fig. 2 is a longitudinal section taken through the turbine proper. Fig. 3 is a cross-section through the turbine proper on the line 3 3 of Fig. 2, Fig. 3 illustrating particularly the end or discharge vanes at one end of the central or main part of the rotor and also illustrating the steam-supply nozzles and the valves controlling the same. Fig. 4 is a cross-section of the turbine proper on the line 4 4 of Fig. 2, this view particularly illustrating the discharge side of one of the superheaters. Fig. 5 is a cross-section of the turbine proper on the line 5 5 of Fig. 2, this view illustrating particularly the divisional plates on the end or wing sections of the rotor. Fig. 6 is a cross-section of the turbine proper on the line 6 6 of Fig. 2, this view illustrating particularly the form of the buckets first receiving the impact of the entering steam and forming elements of the main or central part of the rotor. Fig. 7 is a schematic view showing the general arrangement of the turbine, its valves, and governor. Fig. 8 is a sectional elevation showing the valves, the section being essentially on the line 8 8 of Fig. 9. Fig. 9 is a sectional plan view looking down from the section on the line 9 9 of Fig. 8. Fig. 10 is a face view of the valve-chest of one of the automatic valves shown in Fig. 8, this view particularly illustrating by broken lines inlet and exhaust ports in said valve-chest. Fig. 11 is a detail perspective view of the steam-distributing valve employed in the chest particularly shown in Fig. 10, Fig. 11 showing the ports of the distributing-valve which register with the ports of the valve-chest. Fig. 12 is a detail perspective view of one of the divisional plates employed in each end or wing part of the rotor. Fig. 13 is a detail perspective view of one of the diagonal vanes employed on both parts of the rotor. Fig. 14 is a detail perspective view of one of the buckets employed on the central or main part of the rotor. Fig. 15 is a fragmentary elevation looking toward the inner side of one of the sections of which the main or central part of the rotor is composed, this view particularly showing a group of the buckets on said main part of the rotor and illustrating the manner in which they are secured in place. Fig. 16 is a fragmentary perspective view of one of said sections of the main or central part of the rotor.

The apparatus may be arranged upon a suitable base, the outline of which is indicated at 20 in Fig. 1. The turbine is provided with a main shell 21, exhausting at each end into hoods 22, the pipes 23 of which lead, for example, downward through the base 20, as indicated by the broken lines in Fig. 2. The main shaft 24 of the turbine passes axially through the shell and terminates in stuffing-boxes in the hoods 22. 26 indicates suitable pedestals in which said shaft is mounted.

The rotor is keyed on and turns with the main shaft 24. The main or central part of the rotor is formed of five disk-like sections 27, connected as a unit by tie-rods 28 and provided in their side faces adjacent to their peripheries with matching undercut grooves 29, receiving T-shaped projections 30 and 31, formed on or fastened to the inner end flanges 32ª and 33ª of the vanes 32 and buckets 33. (Shown in detail in Figs. 13 and 14, respectively.) At their outer ends the vanes 32 and buckets 33 have flanges 32ᵇ and 33ᵇ, respectively, and these have formed on or fastened thereto T-shaped projections 34 and 35, which are received and held in undercut grooves 36, formed in the edges or peripheral rings 37. These rings 37 encircle the buckets and vanes, as shown in Fig. 2, and are clamped rigidly together by means of tie-rods 38. In this manner the buckets and vanes 32 and 33 are rigidly and securely connected to disks 27 and rings 37 and the whole of the parts 27 32 33 37 being bound securely together as a single structure. As shown in the drawings, we preferably provide peripheral rings 37, divided in two groups spaced apart to leave the annular steam-entering space 39, and located midway between this annular steam-space is a peripheral flange or partition 40, preferably formed on the central disk 27 and serving to divide the entering steam-jets into two parts, which pass, respectively, toward the ends of the turbine, as will hereinafter fully appear.

21ª indicates an annular interior rib on the shell 21, which fits into the steam-entering space 39 outward from the partition 40 to prevent the escape of steam outward from the periphery of the partition. (See Fig. 2.) The partition or flange 40 separates the main part of the rotor, and indeed the entire turbine, into two sections, and at each side of said flange or partition an annular series of buckets 33 and an annular series of vanes 32 are arranged. As shown best in Fig. 7, the buckets 33 extend out from the flange or partition 40 diagonally across the axis of the rotor and lead the steam-jets to the vanes 32, which extend diagonally across the rotor-axis in a direction opposite that taken by the buckets, so that steam entering the turbine, as indicated by the arrows in Fig. 7, strikes the buckets 33 and by impact thereon exercises a rotating influence in the direction of the arrow $a$ in said view and after passing from the buckets takes its course through the vanes 32. By the reaction of the steam in passing therefrom a further impulse is given the rotor also in the direction of said arrow $a$. It will also be apparent from said view that the buckets 33 are spaced considerably wider apart than the vanes 32, and, as Figs. 6 and 14 show, the buckets are provided with diagonal walls 33ᶜ, which act properly to direct the steam into the vanes 32.

The end or wing sections of the rotor are each made up, according to the form of the invention here illustrated, of disks 41, secured together by tie-rods 42 and having undercut grooves 43, essentially the same as the elements 27 and 28 before described. These end or wing parts of the rotor have partitions 44, running parallel to the axis of the rotor, and vanes 45, disposed diagonally, essentially the same as the vanes 32 above described. The said partitions 44, as shown fully in Fig. 12, have T-shaped projections 46 formed on or fastened to their end flanges 44ª, and said partitions are located at the inner ends of the end sections, with their projections 46 engaged between the adjacent matching grooves 43 of the sections 41. The vanes 45 are located at the outer ends of the end sections of the rotor and have T-shaped projections 47 attached to their inner end flanges 45ª, which projections 47 are held between the adjacent matching grooves 43. Each end part of the rotor has three concentric peripheral rings 48, clamped together by tie-rods 49 and formed with matching undercut grooves 50, which receive T-shaped projections 51 on the outer end flanges 44ᵇ of the partitions 44 and T-shaped projections 52 on the outer end flanges 45ᵇ of the vanes 45. This arrangement clamps rigidly together the parts 41, 44, 45, and 48 in essentially the same manner as the elements of the main or central part of the rotor.

As Fig. 2 clearly shows, the end parts of the rotor are spaced from the main part, and within this space lie the before-referred-to superheaters, each of which comprises, as best shown in Figs. 2 and 4, a drum-like main part 53, fastened securely within the shell 21 and having steam-passages 54 tapering from the main part of the rotor toward the end parts. The drum 53 is hollow between the passages 54, and the chambers thus formed in said drum communicate central space 55, formed by the inner walls of the drum and by a sleeve 56, having side flanges 57 extending to and engaged with the side faces of the drum. Through the sleeve of each superheater the shaft 24 loosely passes. The interior chambers of the superheater-drums 53 are supplied with live steam through pipes 58, which pass through the shell 21 and into the superheaters from any desired source of live steam—for example, from the main supply-pipe 59. The steam in passing from the vanes 32 at relatively reduced pressure enters the passages 54 of the superheater and in moving through the same absorbs further heat and acquires a higher pressure and greater kinetic energy, which is utilized as the steam passes on to the end or wing portion of the rotor.

The main steam-pipe 59 leads into a chest 60, provided with a number, preferably three, of cylindric interior walls 61, forming chambers communicating with the interior of the chamber 60 by openings 61ª. (See Figs. 8 and 9.) From these chambers formed by the walls 61 nozzle-pipes 62 pass, respectively, to the shell 21. These nozzle-pipes are located at equidistant points around the shell and are so disposed as to communicate directly with the steam entering groove or passage 39 in the main or central part of the rotor, the steam-pipes passing through the rib 21ª, as shown in Fig. 2. Steam, therefore, is admitted into the shell at a plurality of equidistant points around the circumference thereof, and the various jets are caused to exercise their force upon the rotor with the result before explained and the strain incident to the operation is distributed equally, so as to avoid as fully as possible destructive strain on the bearings and other parts of the turbine. The movement of the steam into the chambers formed by the walls 61, and consequently the steam supplied to the turbine, is controlled by piston-valves 63, which operate in the cylindric walls 61 and are movable to cover and uncover the openings 61ª. (See Fig. 8.) Said piston-valves 63 have rods 64 attached, and these rods pass upward into cylinders 65, mounted on the chest 60, carrying within said cylinders pistons 66.

67 indicates screw-stops for limiting the upward or opening movement of the elements 63, 64, and 66. Said cylinder 65 is fitted with a valve-chest 68, controlling steam movement through ports 69 in the cylinders and by means of which the pistons 66 and their connected parts may be moved toward one or the other end of their cylinders, as desired. Slide-valves 70, provided with ports 70ª, operate in the valve-chests, so as to alternately connect the inlet-port 69 with the exhaust-port after the manner of the ordinary reciprocating steam-engine, thus bringing about the reciprocation of the parts 66, 64, and 63, as will be understood from the prior art. Steam is supplied to the chest 68 through pipes which pass from the chest 60 or any other suitable source, (see Figs. 3 and 8,) and the exhaust from said chest is taken off through pipes 72, passing, for example, to one of the exhaust-pipes 23 of the turbine. By means of the mechanism above described it may be seen that any one or all of the piston-valves 63 may be moved downward to cover the ports 61ª, thus cutting off any part or the whole of the steam supplied to the turbine. This control of the steam-supply is brought about by the reciprocation of the slide-valves 70 through the medium of stems 73, connected to the slide-valves (see Figs. 10 and 11) and operated by crank-arms 74, respectively attached to the governor-shafts 75. Said governor-shafts 75 are three in number, two being tubular and the three being fitted together one within the other, as shown in Fig. 1. The shafts are rockably mounted in pedestals 76, rising from the base 20 or any other support desired. Attached to each shaft 75 are two adjustable tappet-arms 77. Coacting with these arms is a disk 78, arranged to slide on the shaft 24, as shown in Fig. 1, or, if desired, on a counter-shaft 24ª, (see Fig. 7,) suitably geared with the main shaft. The disk 78 is connected by a link 79 with elbow-levers 80, fulcrumed to a cam 81, also sliding on the shaft 24 or 24ª. The elbow-levers are connected by a retractile spring 81, which holds them yieldingly in the position shown in Fig. 1, and they are joined by pivots to weights 82, slidably mounted in a fly-wheel 83 under the action of centrifugal force, and in so doing they will spread the spring-connected arms of the elbow-levers 80, resulting in a movement of the disk 78 axially along the shaft 24 or 24ª. This movement of the disk 78 causes it to engage one or the other of the pairs of tappets 77 and to impart a rocking movement to one, two, or all of the governor-shafts 75. Two tappet-arms are provided for each governor-shaft, so that it will be engaged upon the movement of the disk 78 in each direction, and said tappet-arms are each successively in advance of the other. The first governor-shaft is first actuated, the second governor-shaft is next actuated, and the third is next actuated, this bringing about a successive movement of the piston-valves. By this mechanism the speed of the turbine may be automatically and economically regulated under the action of the governor.

The organized operation of the apparatus may be traced as follows: The various parts being in the adjustment shown in the drawings and steam being supplied to the chest 60, the steam will pass at once to the nozzle-pipes 62, since when the machine is idle the governor-weights 82 lie at their innermost positions and the valves 63 open, as shown in Fig. 8. Upon the entry of the steam into the turbine-shell it will be divided by the partition 40, and it will pass toward each end of the turbine, successively engaging the buckets 33 and vanes 32, the superheaters, the partitions 44, and vanes 45, and then passing out through the exhaust-hoods 22 and pipes 23. The steam in so passing through the turbine will impart initial movement to the main or central part of the rotor, will escape therefrom to have its temperature raised in the superheater, and will pass from the turbine acting from the end rotor parts, thus giving to the rotor and to the shafts 24 a continuous movement in the direction corresponding to the disposition of the various buckets and vanes and at a speed dependent upon the steam velocity and the governor action, as will be understood from the foregoing description. The action of the governor is automatic and dependent upon the previous adjustment thereof, causing one or more of the jets to be rendered active or inactive, according to the conditions under which the governor is operated.

In the following claims we desire it understood that the term "bucket" when employed alone and not in association with the term "vane" is intended to mean an element on the rotor receiving the action of the motive fluid.

Various changes in the form, proportions, and minor details of our invention may be resorted to at will without departing from the spirit and scope thereof. Hence we consider ourselves entitled to all such variations as may lie within the terms of our claims.

Having thus described our invention, we claim as new and desire to secure by Letters Patent—

1. A turbine having a member acted on by the motive fluid and divided into two parts, and a superheater located between the said parts of said member for the purpose specified, said superheater being chambered to permit the circulation of a heating medium therethrough and having passages for the movement of the motive fluid, said passages tapering toward the discharge end of the turbine.

2. A turbine having a rotor provided with two members, means for clamping them together, a bucket adapted to receive the action of the motive fluid and having a part held between said members, two peripheral rings between which a part of the bucket is also held, and means for clamping the rings together.

3. A turbine having a rotor provided with two members one of said members having an undercut groove, means for clamping said members together, a bucket adapted to receive the action of the motive fluid and having a part fitted in the said groove, two peripheral rings, one of which is provided with an undercut groove, the bucket also having a part fitted in the second-named undercut groove, and means for clamping said peripheral rings together.

4. A turbine having a rotor provided with two members, means for clamping them together, the members having matching undercut grooves, a bucket adapted to receive the action of the motive fluid and having a T-shaped part fitted in the undercut grooves, two peripheral rings having matching undercut grooves also receiving the T-shaped part on the bucket, and means for clamping said peripheral rings together.

5. A turbine having a rotor provided with two annular groups of buckets, the members of each row converging toward the steam-flow, and two annular rows of vanes receiving the steam from the buckets and ranging diagonally opposite to the direction in which the buckets extend.

6. A turbine having a rotor provided with partitions extending parallel to the axis of the rotor, and discharging into the vanes extending diagonally of said axis.

7. A turbine having a rotor comprising a main and an end part, devices attached to the main part of the rotor and adapted to receive the action of the motive fluid, partitions attached to the end part of the rotor and extending parallel to the axis thereof, and vanes receiving the motive fluid from the partitions and extending diagonally of said axis of the rotor.

8. A turbine having a rotor provided with a main and an end part separated from each other, a superheater located between said parts, a device attached to the main part and adapted to receive the action of the motive fluid, partitions attached to the end part and receiving the motive fluid from the superheater, said partitions extending parallel to the axis of the rotor, and vanes also attached to the end part of the rotor and receiving the motive fluid from the partitions, the said vanes extending diagonally of the axis of the rotor.

9. A turbine having a rotor, buckets attached thereto, peripheral rings located outward of and encircling the buckets and between which rings parts of the buckets are engaged, and means for clamping the rings together to hold the parts of the rotor secure.

10. A turbine having a rotor, buckets attached thereto, said buckets having projections extending from their outer ends, peripheral rings between which said projections of the buckets are received, and means for clamping said rings together.

11. A turbine having a rotor, divided into two parts spaced from each other and adapted to have the working steam pass from one to the other, and a superheater for the steam interposed between said parts of the rotor and adapted to reheat the steam on its way from one of said parts to the other, said superheater comprising walls forming a chamber and a passage through the same through which the working steam passes from one part of the rotor to the other, and means for conducting reheating-steam to said chamber to heat the walls thereof.

12. A turbine having a rotor divided into two parts adapted to have the steam pass from one to the other, a superheater located between said parts of the rotor and having a passage therein to conduct the working steam from one to the other part of the rotor and means for supplying reheating-steam to the interior of the superheater.

13. A turbine having a rotor provided with two parts adapted to have the steam successively engaged therewith, the first part of the rotor having buckets and the second part of the rotor having partitions running parallel to the axis of the rotor, and vanes disposed diagonally to said axis and receiving the steam from the spaces between the partitions.

14. A turbine having a rotor provided with two parts adapted to have the steam successively engaged therewith, the first part of the rotor having buckets and the second part of the rotor having partitions running parallel to the axis of the rotor, vanes disposed diagonally to said axis and receiving the steam from the spaces between the partitions, and a superheater interposed between said parts of the rotor to reheat the steam as it passes from the first to the second part.

15. A turbine having a rotor provided with two parts adapted to have the steam successively engaged therewith, the first part of the rotor having buckets and the second part of the rotor having partitions running parallel to the axis of the rotor, vanes disposed diagonally to said axis and receiving the steam from the spaces between the partitions, and a superheater arranged between said parts of the rotor and having a passage therein for the movement of the steam from one part to the other of the rotor whereby to reheat the steam.

16. A turbine having a rotor provided with two annular groups of buckets, the members of each group converging toward the steam-flow, two annular rows of vanes receiving the steam from the buckets and ranging diagonally opposite to the direction in which the buckets extend, and a partition carried with the rotor and separating said annular groups of buckets.

17. A turbine having a rotor provided with two annular groups of buckets, the members of each group converging toward the steam-flow, two annular rows of vanes receiving the steam from the buckets and ranging diagonally opposite to the direction in which the buckets extend, and a partition carried with the rotor and separating said annular groups of buckets, said partition being located opposite the steam-inlet orifices so as to split or divide the steam-supply and distribute part to one group of buckets and part to the other.

18. A turbine having a steam-engaging part comprising a main portion, flanges extending transversely from the ends thereof, and a T-shaped projection extending outward from the flanges.

19. A turbine having a shell and a rotor operating therein, means for conducting a plurality of motive-fluid jets into different parts of the shell, a motive-fluid supply communicating with each of said jets, a valve controlling each communication, a cylinder for each valve, a piston operating in each cylinder, a connection between the pistons and the respective valves, an additional valve for each cylinder, the additional valves serving to admit fluid-pressure alternately to the sides of the pistons, and a synchronous governor having connection with said additional valves to operate them in succession, whereby to successively cut off the fluid-jets leading into the shell of the turbine.

20. A turbine comprising a shell and a rotor operating therein, a steam-chamber located outside of the shell, jet-pipes passing from said chamber into different parts of the shell, cylinders within the chamber from which cylinders said jet-pipes respectively lead, said cylinders communicating with the interior of the chamber, a piston-valve in each cylinder, additional cylinders mounted on the chamber respectively opposite the cylinders in each chamber, pistons operating in the additional cylinders, means connecting the pistons respectively with the piston-valves, valve devices controlling the supply of fluid-pressure to the sides of said pistons, and a synchronous governor operating the last-named valve devices.

21. A turbine having a shell and rotor operating therein, a means forming a steam-chamber outside of the shell, steam-jet pipes passing from said chamber into different parts of the shell, valve devices juxtaposed to said chamber and independently controlling said movement through the jet-pipes, and a synchronous governor for operating said valve devices in succession.

In testimony whereof we have signed our names to this specification in the presence of two subscribing witnesses.

HORATIO G. WOOD.
HIRAM BURLINGHAM.

Witnesses:
HENRY BULL, Jr.,
WM. S. COOPER.